(12) United States Patent
Holman et al.

(10) Patent No.: US 6,910,109 B2
(45) Date of Patent: Jun. 21, 2005

(54) TRACKING MEMORY PAGE STATE

(75) Inventors: Thomas J. Holman, Portland, OR (US); Andrew V. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 09/164,088

(22) Filed: Sep. 30, 1998

(65) Prior Publication Data

US 2003/0191913 A1 Oct. 9, 2003

(51) Int. Cl.[7] .............................. G06F 12/00
(52) U.S. Cl. ..................... 711/156; 711/5; 711/206
(58) Field of Search .................. 711/156, 105, 711/5, 206, 207, 208

(56) References Cited

U.S. PATENT DOCUMENTS

| | | | | |
|---|---|---|---|---|
| 5,634,112 A | * | 5/1997 | Thome et al. | 711/154 |
| 5,781,789 A | * | 7/1998 | Narayan | 712/23 |
| 5,796,978 A | * | 8/1998 | Yoshioka et al. | 711/206 |
| 5,835,963 A | * | 11/1998 | Yoshioka et al. | 711/207 |
| 5,974,501 A | * | 10/1999 | Shaver et al. | 711/105 |
| 6,154,821 A | * | 11/2000 | Barth et al. | 365/233 |

\* cited by examiner

*Primary Examiner*—M. D. Anderson
(74) *Attorney, Agent, or Firm*—Blakely, Sokoloff, Taylor & Zafman LLP

(57) ABSTRACT

The present invention is a method and apparatus for tracking a state of a page of a memory device which has at least a dependent bank structure. A page entry table contains attribute entries of the page. An access control circuit generates access information and a command in response to a memory access. A tracking circuit is coupled to the page entry table and the access control circuit to update the attribute entries in the page entry table according to the command and the access information.

30 Claims, 11 Drawing Sheets

| CONDITION | TRACK TABLE |
|---|---|

INITIAL STATE
X = DON'T CARES

810

| DEVICE ID | BANK ID | ROW ADDR | DEP1 | DEP2 | V |
|---|---|---|---|---|---|
| 1 | 2 | i | 1 | 3 | 1 |
| 1 | 4 | i | 3 | 5 | 1 |
| X | X | X | X | X | 0 |
| X | X | X | X | X | 0 |

⇓⇓

OPEN DEVICE 3
BANK 3

820

| DEVICE ID | BANK ID | ROW ADDR | DEP1 | DEP2 | V |
|---|---|---|---|---|---|
| 1 | 2 | i | 1 | 3 | 1 |
| 1 | 4 | i | 3 | 5 | 1 |
| 3 | 3 | i | 2 | 4 | 1 |
| X | X | X | X | X | 0 |

⇓⇓

CLOSE DEVICE 1
BANK 3

830

| DEVICE ID | BANK ID | ROW ADDR | DEP1 | DEP2 | V |
|---|---|---|---|---|---|
| X | X | X | X | X | 0 |
| X | X | X | X | X | 0 |
| 3 | 3 | i | 2 | 4 | 1 |
| X | X | X | X | X | 0 |

*FIG. 8*

TRACKING MEMORY PAGE STATE

BACKGROUND

1. Field of the Invention

This invention relates to computer systems. In particular, the invention relates to memory devices.

2. Description of Related Art

A dynamic random access memory (DRAM) device is divided into banks where each bank consists of an array of memory cells plus a set of sense amplifiers for holding data. When the sense amplifiers of a bank contain valid data, the bank is referred to as "open"; otherwise, it is "closed".

In conventional DRAMs, the bank structure is independent, i.e., each bank has its own complete set of sense amplifiers. This allows independent operation of the banks.

DRAMs may also have banks organized in a dependent manner. In this organization, adjacent banks share a portion of the sense amplifiers. Thus, when bank j is using the sense amplifiers, banks j−1 and j+1 cannot. In other words, when bank j is "open", banks j−1 and j+1 are "locked" from being accessed. Banks j−1, j, and j+1 constitute a "bankset".

The dependent structure of DRAMs presents a challenge to the design of the memory controller in a high performance microprocessor system. In addition, the memory controller should be able to work with DRAMs having mixed structures, i.e., some portions have dependent structures and some portions have independent structures. An intelligent memory controller should be able to track the state of all pages used within a memory system.

Existing memory controllers only deal with independent structures. Dependent structures introduce additional requirements and constraints on the mechanism to track page state.

Therefore there is a need in the technology to provide a simple and efficient method to track the state of a page in a memory device.

SUMMARY

The present invention is a method and apparatus for tracking a state of a page of a memory device which has at least a dependent bank structure. A page entry table contains attribute entries of the page. An access control circuit generates access information and a command in response to a memory access. A tracking circuit is coupled to the page entry table and the access control circuit to update the attribute entries in the page entry table according to the command and the access information.

BRIEF DESCRIPTION OF THE DRAWINGS

The features and advantages of the present invention will become apparent from the following detailed description of the present invention in which:

FIG. 8 is a diagram illustrating a sequence of state tracking according to one embodiment of the invention.

DESCRIPTION

The present invention relates to a method and apparatus for tracking a state of a page in a memory device which has dependent banks. An entry page table stores the access information including the dependencies. A comparator/matching array matches the access information with the entries in the entry page table. An access status generator produces the access status based on the result of the matching. The entry page table is updated according to the access status. The present invention provides an efficient page tracking mechanism for a memory device with dependent and mixed structures.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
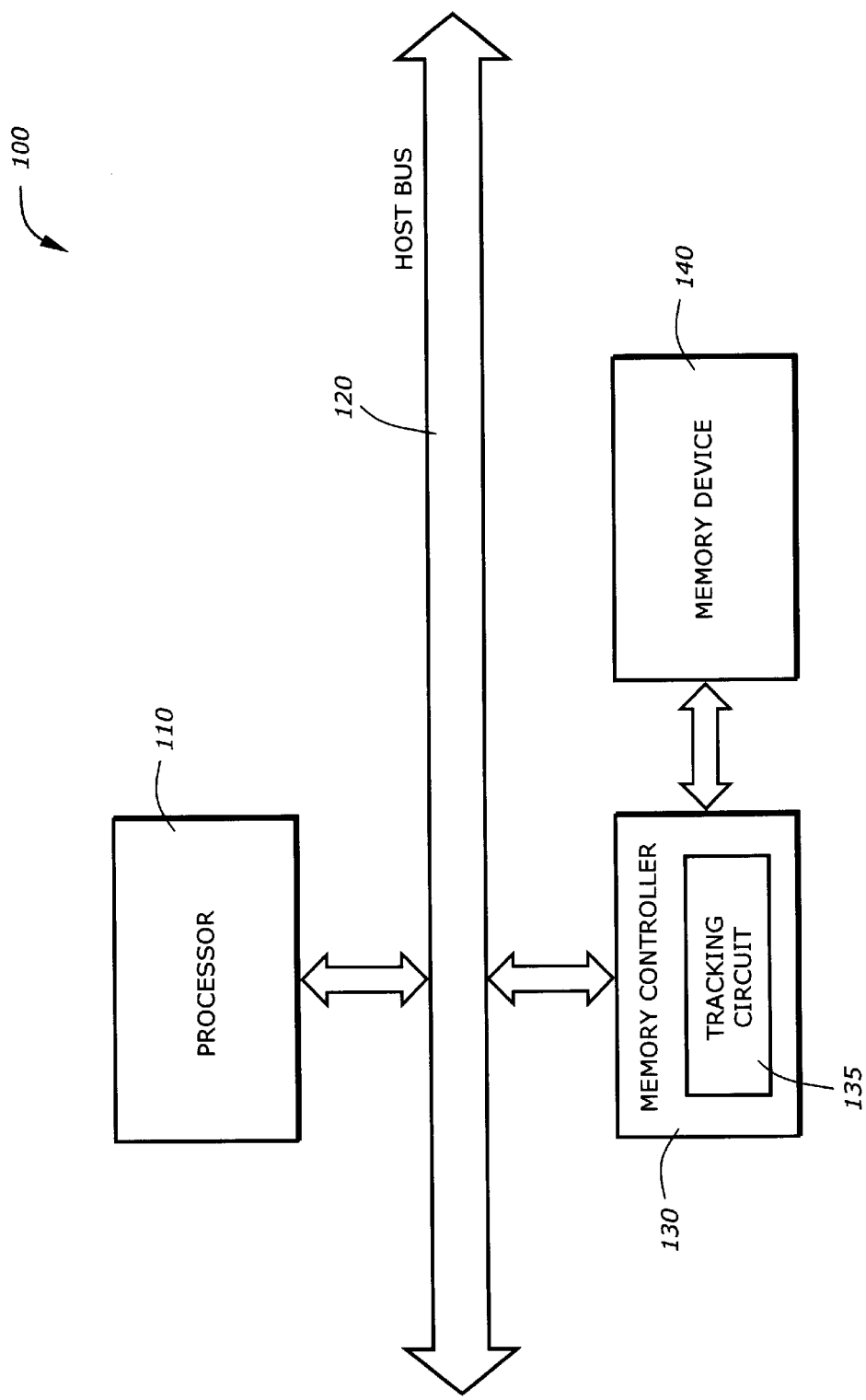
FIG. 1 is a diagram illustrating a computer system in which one embodiment of the invention can be practiced.

FIG. 1 is a diagram illustrating a computer system in which one embodiment of the invention can be practiced. The computer system 100 includes a processor 110, a host bus 120, a memory controller 130, and a memory device 140.

The processor 110 is any microprocessor. The host bus 120 allows the processor 110 to communicate with other processors and/or devices in the system.

The memory controller 130 is a device that generates control information to the memory device 140 when the processor 110 generates a request for memory access. The memory controller 130 includes a tracking circuit 135 to track the state of the pages in the memory device.

The memory device 140 contains one or more memory devices accessible to the processor 110. In one embodiment, the memory device 140 is a dynamic random access memory (DRAM) having at least a dependent structure. The memory device 140 may include a DRAM having independent structure or mixed independent and dependent structures.

Figure 2:
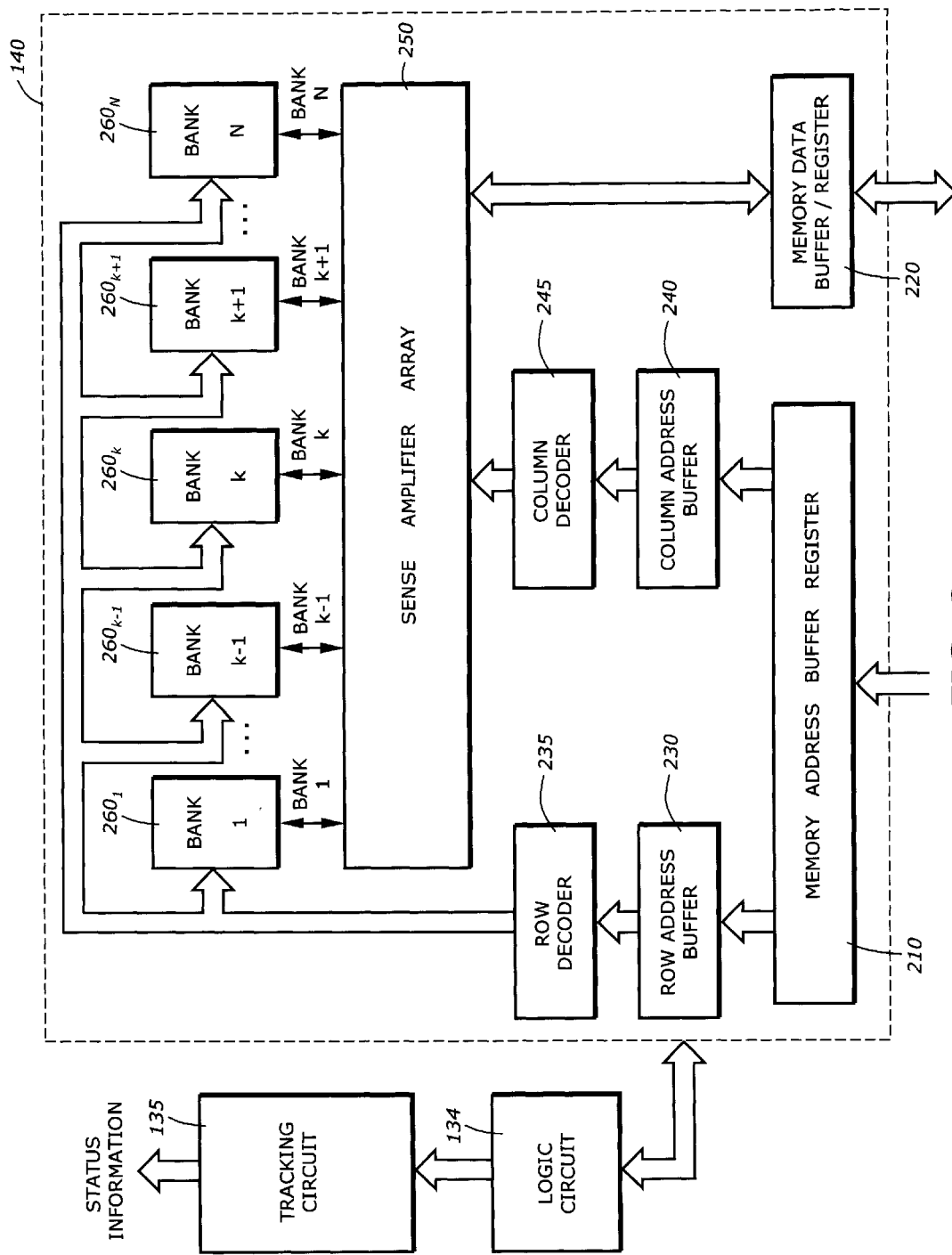
FIG. 2 is a diagram illustrating a memory device tracked by a page tracking circuit according to one embodiment of the invention.

FIG. 2 is a diagram illustrating a memory device tracked by a tracking circuit according to one embodiment of the invention. The memory device 140 includes a memory address buffer/register 210, a memory data buffer/register 220, a row address buffer 230, a row decoder 235, a column address buffer 240, a column decoder 245, a sense amplifier array 250, and a number of banks $260_1$ to $260_N$.

The memory address buffer/register 210 buffers or stores the memory address as generated by the memory controller 130. The memory address typically includes a row address and a column address. The memory data buffer/register 220 buffers or stores the read/write data as requested or generated by the processor 110 via the memory controller 130. The row address buffer 230 contains the row address of the memory address. In most instances, the row address is related to the page number of the memory device. The row decoder 235 decodes the row address information to enable the corresponding memory banks $260_1$ to $260_N$. The column address buffer 240 contains the column address of the memory address. The column decoder 245 decodes the column address information to enable or select the corresponding sense amplifiers in the sense amplifier array 250.

The sense amplifier array 250 includes a number of sense amplifiers that interface to the memory banks $260_1$ to $260_N$. The organization of the sense amplifier array 250 depends on whether the memory device has a dependent, independent, or mixed structures.

Each of the memory banks $260_1$ to $260_N$ is a storage unit to store the data. Each memory bank consists of a number of memory cells. The memory banks $260_1$ to $260_N$ are enabled by the row decoder 235.

Figure 3A:
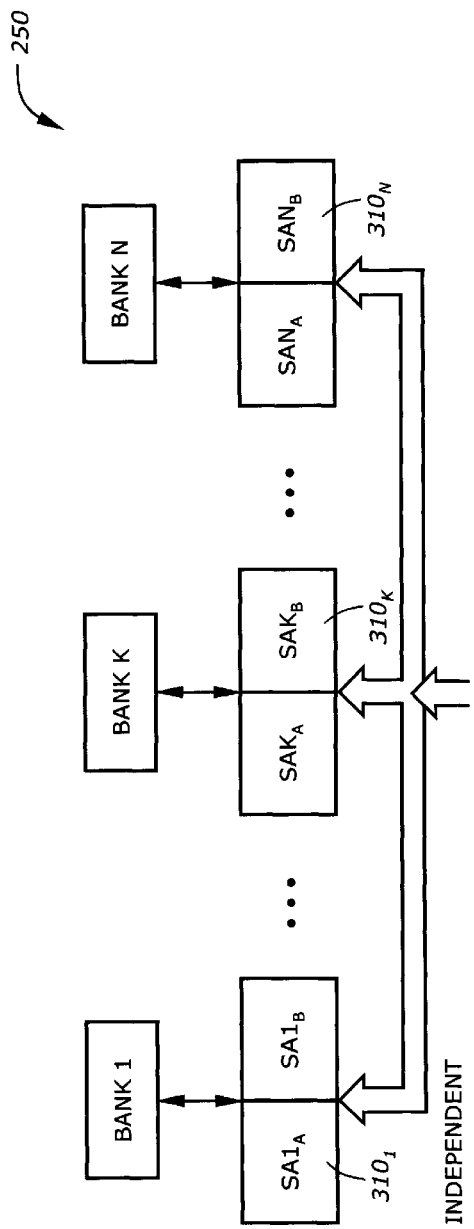
FIG. 3A is a diagram illustrating a sense amplifier array supporting an independent bank structure of a memory device according to one embodiment of the invention.

FIG. 3A is a diagram illustrating a sense amplifier array supporting an independent bank structure of a memory device according to one embodiment of the invention. The sense amplifier (SA) array 250 includes N sense amplifier pairs $310_1$ to $310_N$. The SA pairs $310_1$ to $310_N$ are connected to banks 1 to N, respectively.

Figure 3B:
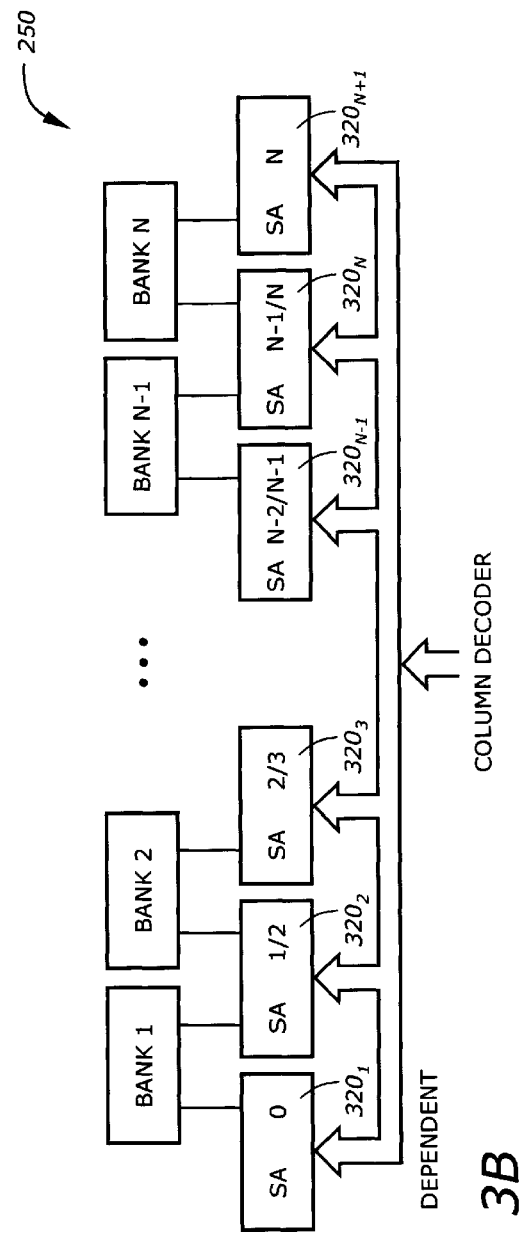
FIG. 3B is a diagram illustrating a sense amplifier array supporting a dependent bank structure of a memory device according to one embodiment of the invention.

FIG. 3B is a diagram illustrating a sense amplifier array supporting a dependent bank structure of a memory device according to one embodiment of the invention. The sense amplifier (SA) array 250 includes N+1 sense amplifiers $320_1$ to $320_{N+1}$. The SA k/k+1 supports banks k and k+1.

Figure 4:
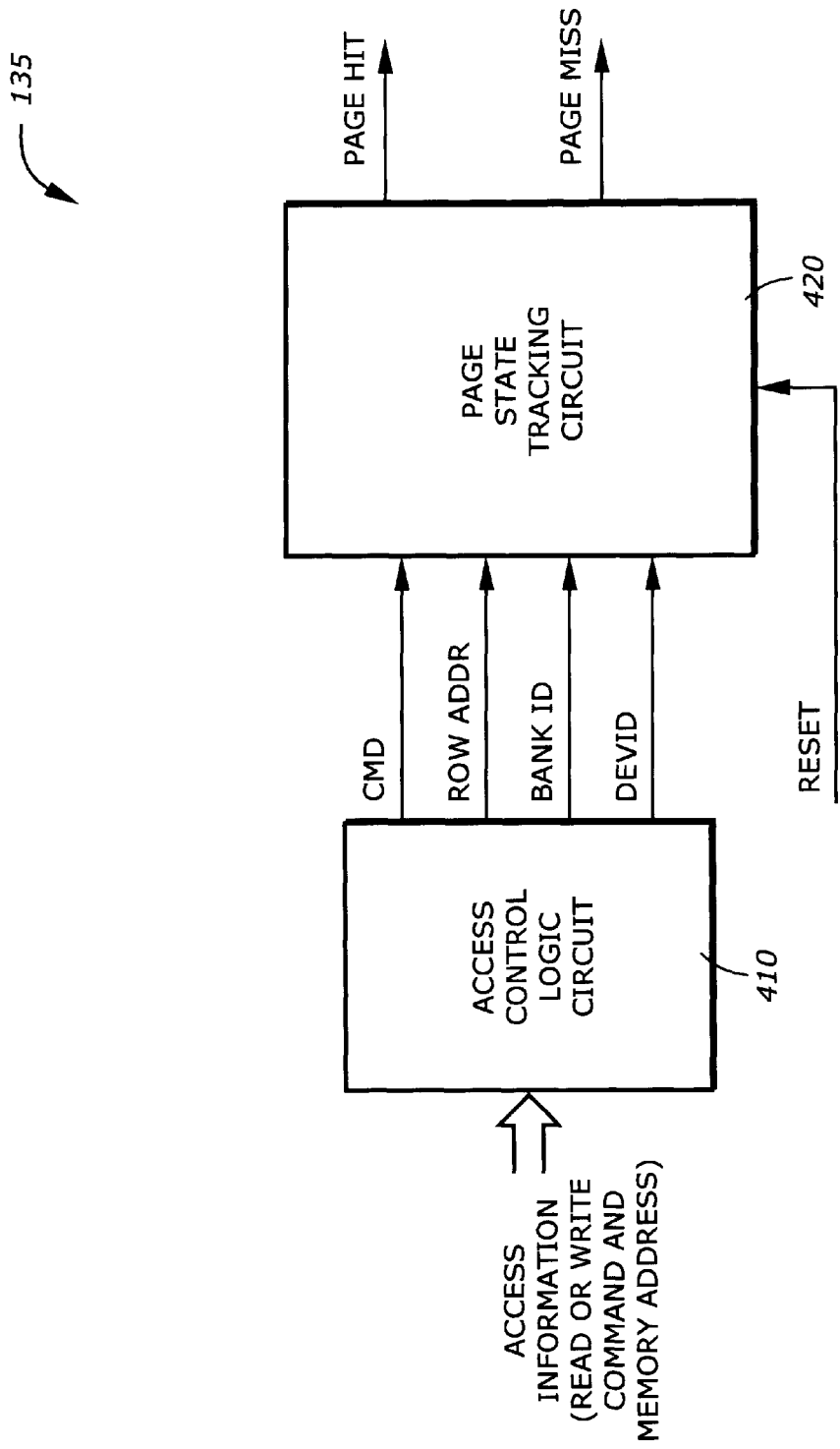
FIG. 4 is a diagram illustrating a tracking circuit according to one embodiment of the invention.

FIG. 4 is a diagram illustrating a tracking circuit according to one embodiment of the invention. The tracking circuit 135 includes an access control logic circuit 410 and a page state tracking circuit 420.

The access control logic circuit 410 receives the access information from the processor 110 as decoded by the memory controller 130. The access information includes a memory access request, a type of access (read or write), and a memory address of the access.

The access control logic circuit 410 generates a command (CMD), a row address (ROW ADDR), a bank identification (BANK ID), and a device identification (DEV ID). The CMD includes at least a match command (MATCH_CMD), an open command (OPEN_CMD), and a close command (CLOSE_CMD). The match command indicates that the access information is to be matched against the stored attributes of the pages in the page state tracking circuit 420. The open command indicates that new entry is being loaded and the corresponding page is valid. The close command indicates that specified bankset in the memory banks is closed and the corresponding page is not valid. The ROW ADDR is the decoded row address from the memory address. Typically, the ROW ADDR is the page number of the memory device. The BANK ID indicates the bank number in the memory banks. The DEV ID indicates the device to access in memory and is decoded to indicate the type of bank structure of the memory device, e.g., independent, dependent, or mixed structure.

The page state tracking circuit 420 receives the decoded access information from the access control logic circuit 410 and generates status information for the memory access. In one embodiment, the status information includes a page hit and a page miss information. A page hit indicates that the references page is valid and available for access. A page miss indicates that the referenced page is not valid and not available.

Figure 5:
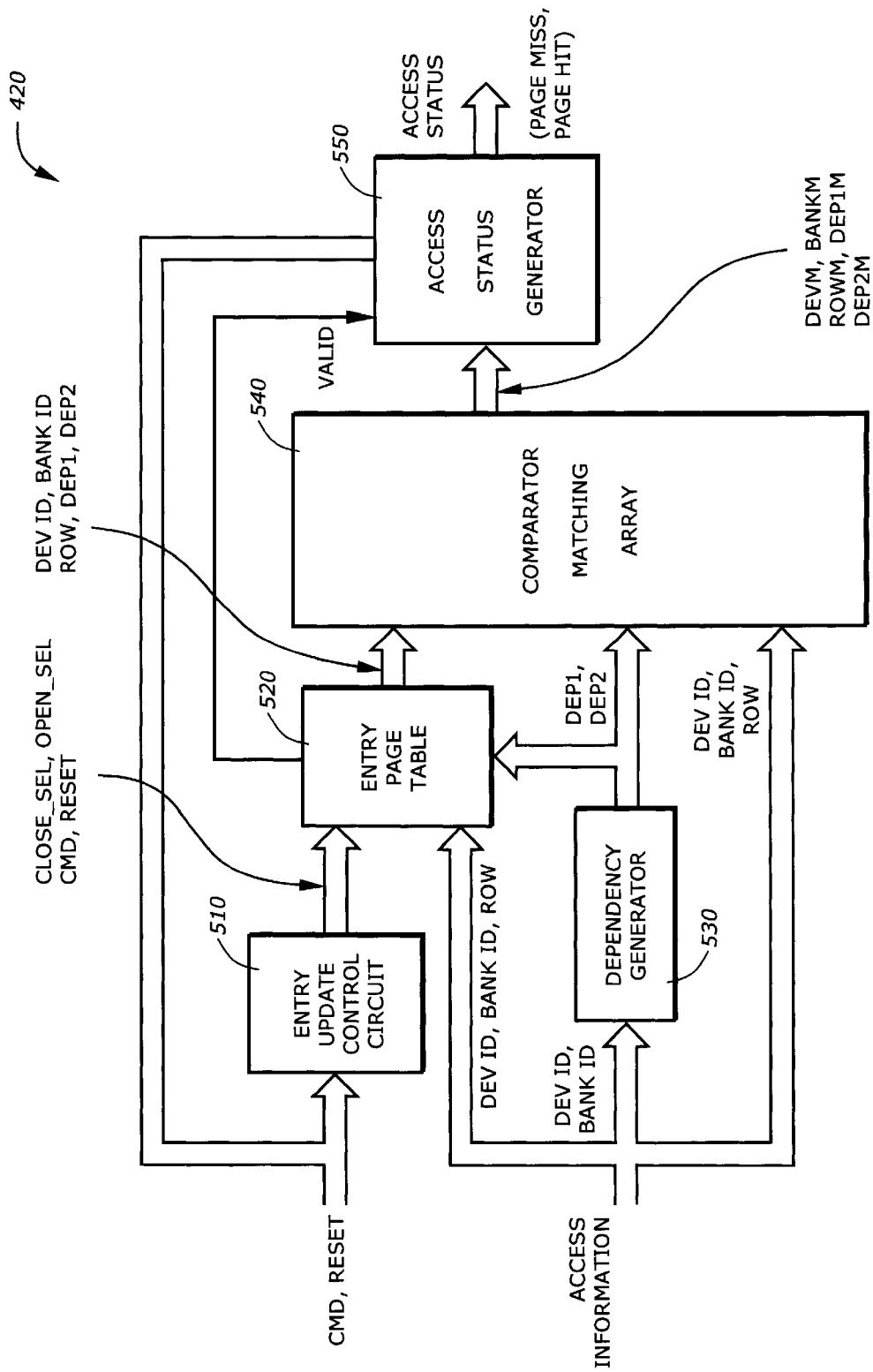
FIG. 5 is a diagram illustrating a page state tracking circuit according to one embodiment of the invention.

FIG. 5 is a diagram illustrating a page state tracking circuit according to one embodiment of the invention. The page state tracking circuit 420 includes an entry update control circuit 510, an entry page table 520, a dependency generator 530, a comparator matching array 540, and an access status generator 550.

The entry update control circuit 510 loads and updates the entries in the entry page table 520 based on the nature of the access request and the attribute matching results. The entry page table 520 contains the entry attributes of the open pages in the memory device(s). The entry page table 520 essentially stores the state of the open pages in the memory device. The state of each page is tracked by updating the attribute entries according to the access information and the current state of the page. The dependency generator 530 generates the dependency codes for the memory bank being accessed. The comparator matching array 540 matches the attributes from the entry page table 520 and the attributes obtained and/or decoded from the access information. The comparator matching array 540 generates the result of the attribute matching. The access status generator 550 receives the result of the attribute matching from the comparator matching array 540 and the CMD and reset and a valid bit information to generate the status information of the memory access. In one embodiment, the status information includes page hit and page miss information.

Figure 6A:
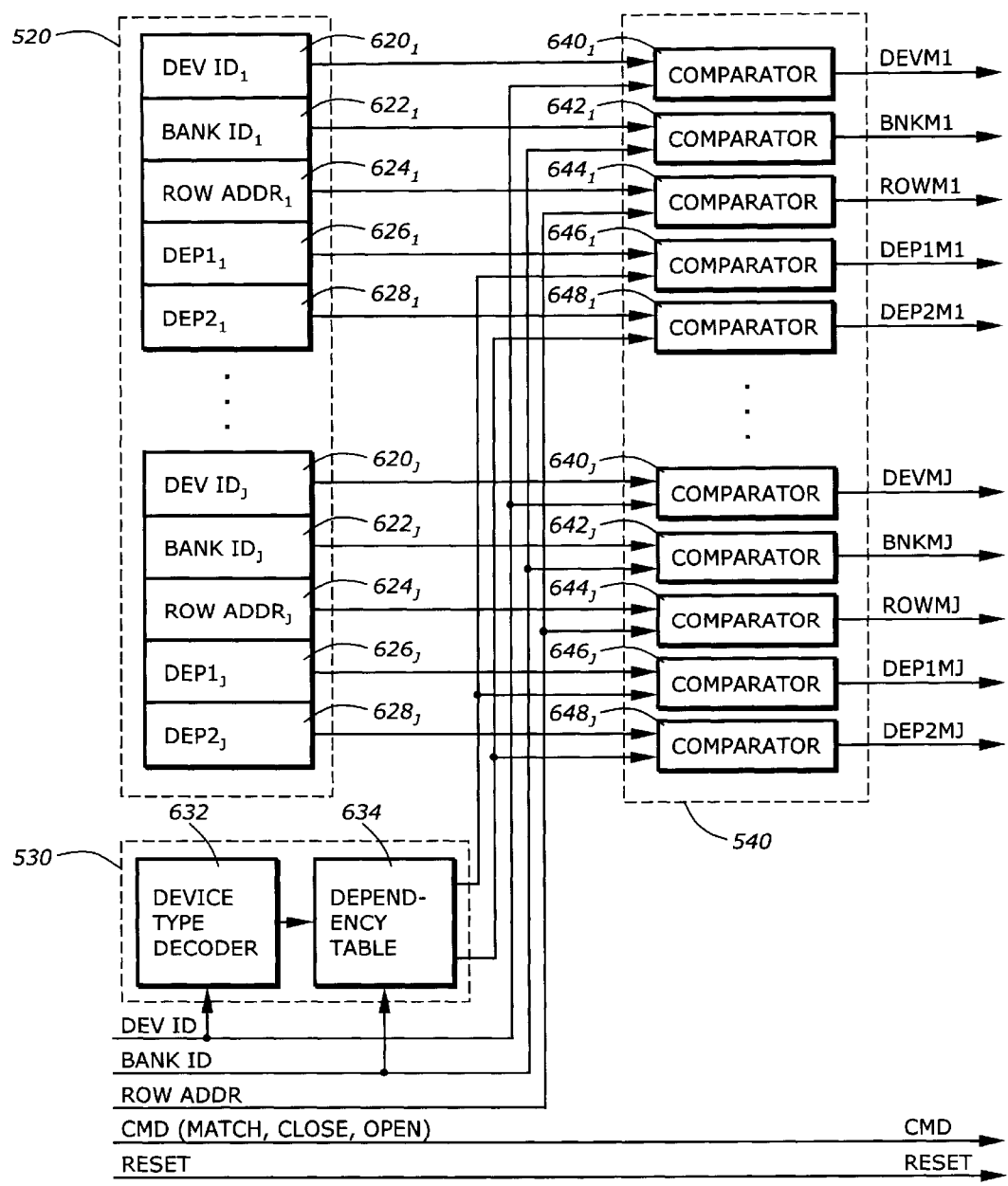
FIG. 6A is a diagram illustrating an entry page table, dependency generator, and a matching array according to one embodiment of the invention.

FIG. 6A is a diagram illustrating the entry page table 520, the dependency generator 530, and the comparator matching array 540 according to one embodiment of the invention.

The entry page table 520 includes a number of entries corresponding to the active pages in the memory device. An active page is a page that can be open, i.e., available for memory access. The number of pages that can be open at once is a design parameter to be selected according to the performance and complexity trade-off. Each entry corresponds to a page. Each entry has a number of attributes or fields. As shown in FIG. 6A, there are J entries, corresponding to J pages in the memory device that are open at once. These attributes or fields include a device identification (DEV ID) $620_1$ to $620_J$, a bank identification (BANK ID) $622_1$ to $622_J$, a row address (ROW ADDR) $624_1$ to $624_J$, a first dependency code (DEP1) $626_1$ to $626_J$, and a second dependency code (DEP2) $628_1$ to $628_J$.

The dependency generator 530 includes a device type decoder 632 and a dependency table 634. The device type decoder 632 decodes the device type to generate a pointer to look up the dependency code in the dependency table 634. Examples of device type include the type of the bank structure: independent, dependent, and mixed. The dependency table 634 stores the dependency code for the bank being accessed according to the device type. For example, if the device type refers to an independent bank structure, then the dependency code is the same as the bank identification. If the device type refers to a dependent bank structure with adjacent dependency, then the dependency code includes the identification of the adjacent banks. If the device type refers to a mixed structure, then the dependency code includes the corresponding bank identification. In one embodiment, the dependency table is a look-up table, either in non-volatile memory or in random access memory (RAM) to be initialized by other circuits.

The comparator matching array 540 includes an array of matching circuits to match the entry attributes and the access attributes. In one embodiment, the matching circuits are comparator devices. The number of comparators depends on the number of attributes and the number of pages that can be open at once in the memory device. In the exemplary embodiment shown in FIG. 6A, comparators $640_1$, $642_1$, $644_1$, $646_1$, and $648_1$ compare the entry attributes $DEV\ ID_1$ $620_1$, $BANK\ ID_1$ $622_1$, $ROW\ ADDR_1$ $624_1$, $DEP1_1$ $626_1$, and $DEP2_1$ $628_1$ with the access attributes DEV ID, BANK ID, ROW ADDR, DEP1, and DEP2, respectively. Similarly, comparators $640_J$, $642_J$, $644_J$, $646_J$, and $648_J$ compare the entry attributes $DEV\ ID_J$ $620_J$, $BANK\ ID_J$ $622_J$, $ROW\ ADDR_J$ $624_J$, $DEP1_J$ $626_J$, and $DEP2_J$ $628_J$ with the access attributes DEV ID, BANK ID, ROW ADDR, DEP1, and DEP2, respectively. The comparator/matching array 540 generates the results of the attribute matching via the signal lines $DEVM_1$, $BNKM_1$, $ROWM_1$, $DEP1M_1$, $DEP2M_1$, and $DEVM_J$, $BNKM_J$, $ROWM_J$, $DEP1M_J$, $DEP2M_J$, corresponding to the entries 1 through J, respectively. These signal lines are asserted true (active HIGH) if the corresponding comparator matches its two inputs. For example, if $DEV\ ID_1$ matches the access attribute DEV ID, then $DEVM_1$ is asserted true (logic 1); otherwise DEVM1 is de-asserted false (logic 0).

Figure 6B:
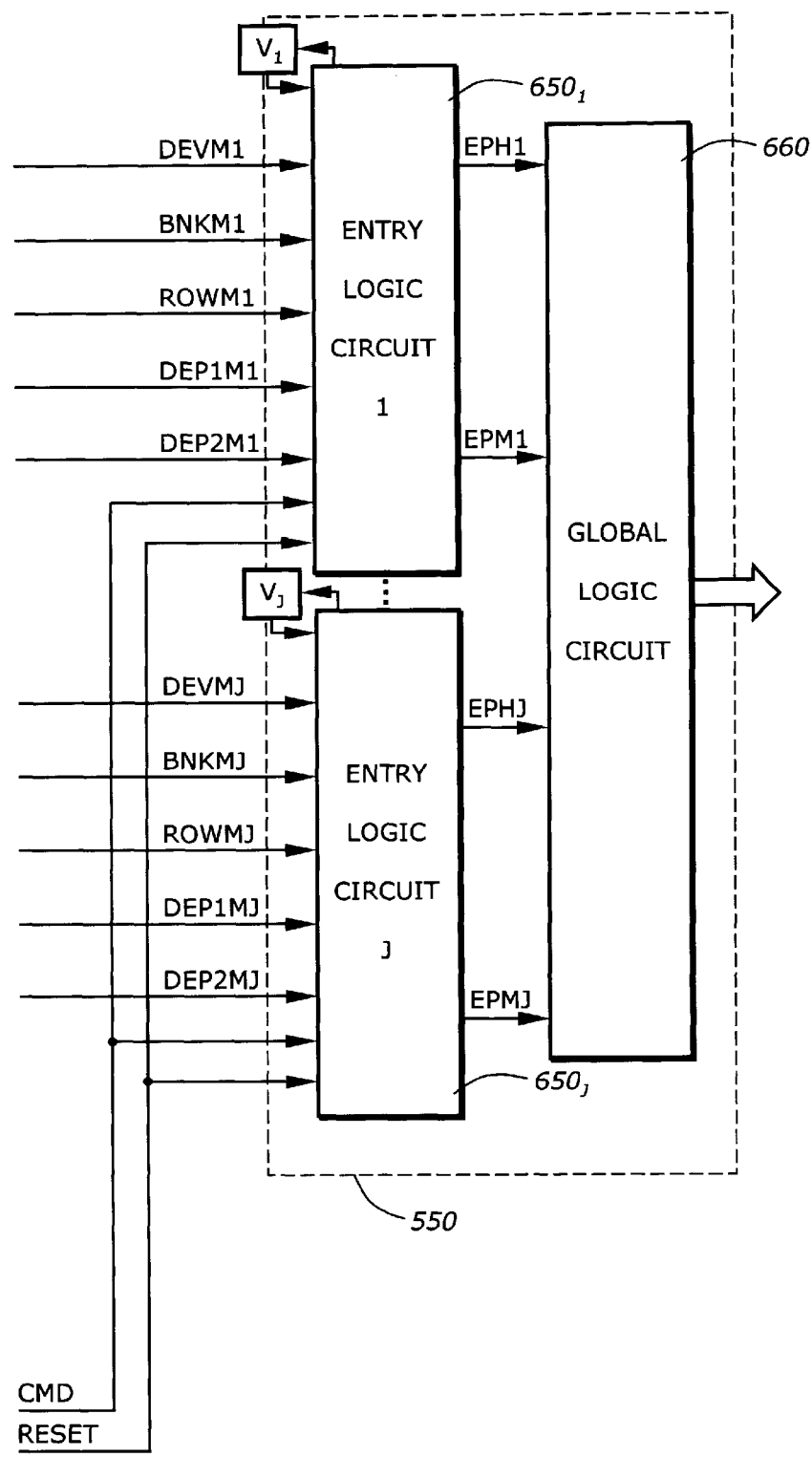
FIG. 6B is a diagram illustrating an access status generator according to one embodiment of the invention.

FIG. 6B is a diagram illustrating the access status generator 550 according to one embodiment of the invention.

The access status generator 550 generates the status of the memory access. In one embodiment, the status information of the memory access includes a page hit and a page miss status. The access status generator 550 includes a number of entry logic circuits $650_1$ to $650_J$, and a global logic circuit 660. Each of the entry logic circuits $650_1$ to $650_J$ corresponds to each entry result in the comparator matching array 540. Each of the entry logic circuits $650_1$ to $650_J$ generates an entry page hit (EPH) or an entry page miss (EPM) result. For J entry logic circuits, there are J pairs of EPH and EPM (e.g., $EPH_1$ to $EPH_J$ and $EPM_1$ to $EPM_J$). The entry EPH and EPM results are used to produce the global page access status by the global logic circuit 660. In addition, these EPH and EPM results are also used to control the entry update control circuit 510 to update the entry page table 520. Each of the entry logic circuits $650_1$ to $650_J$ has a valid storage element (V) to store a valid indicator or valid code for the corresponding page. The valid code is one of the attributes of the memory pages that needs to be kept track of.

Figure 7A:
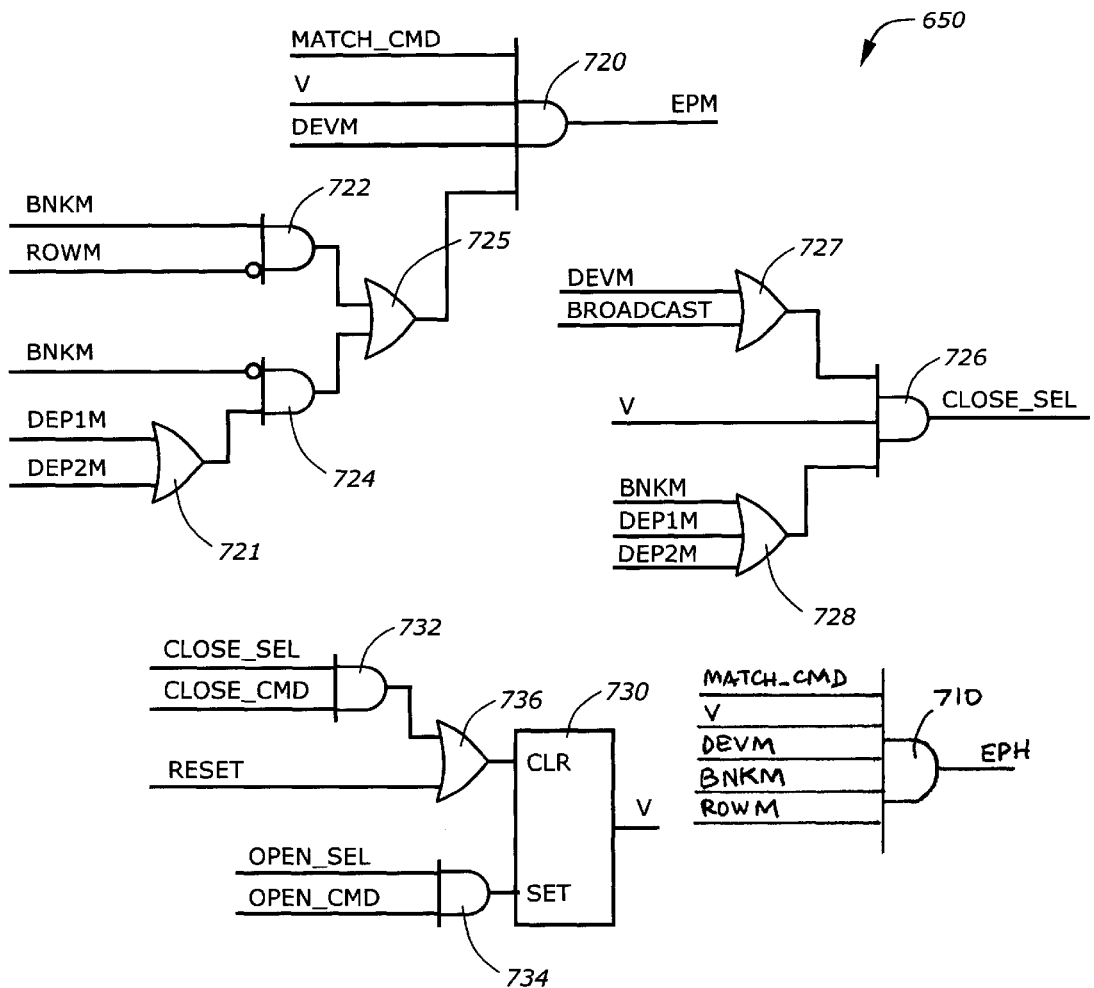
FIG. 7A is a diagram illustrating an entry logic circuit according to one embodiment of the invention.

FIG. 7A is a diagram illustrating an entry logic circuit according to one embodiment of the invention. The entry logic circuit 650 includes a number of logic elements such as gates or flip-flops to generate the results EPH, EPM, and Valid (V).

The EPH result is generated by an AND gate 710 according to the following equation:

EPH=MATCH_CMD and V and DEVM and BNKM and ROWM

The EPM result is generated by AND gates 720, 722, 724, and OR gates 721 and 725 according to the following equation:

EPM=MATCH_CMD and V and DEVM and ((BNKM and (not ROWM)) or ((not BNKM) and (DEP1M or DEP2M)))

The V result is generated by a flip-flop 730, an AND gate 732, an AND gate 734, and an OR gate 736. V is cleared when RESET is asserted or when CLOSE_SEL and CLOSE_CMD are asserted. V is set when OPEN_CMD and OPEN_SEL are asserted. The OPEN_SEL and CLOSE_SEL are selectors to open and close, respectively. The CLOSE_SEL is generated by an AND gate 726, OR gates 727 and 728. The BROADCAST signal is a qualifier to the CLOSE_CMD. The OPEN_SEL selects the "next available entry". The equation for the CLOSE_SEL is:

CLOSE_SEL=V and (DEVM or BROADCAST) and (BNKM or ((not BNKM) and (DEP1M or DEP2M)))

Figure 7B:
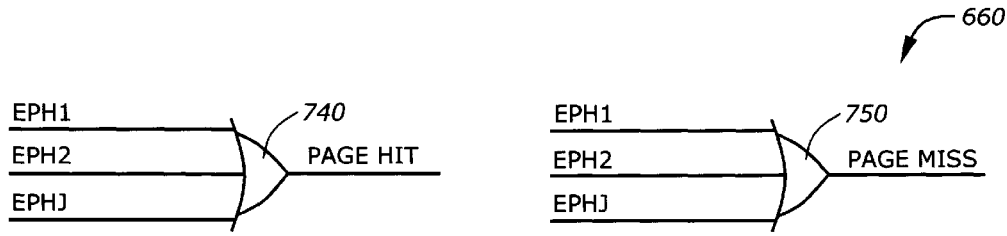
FIG. 7B is a diagram illustrating a global logic circuit according to one embodiment of the invention.

FIG. 7B is a diagram illustrating a global logic circuit according to one embodiment of the invention. The global logic circuit 660 includes OR gates 740 and 750.

The OR gate 740 performs an OR operation of all the entry page hit results $EPH_1$ to $EPH_J$ to generate the PAGE HIT status. The OR gate 750 performs an OR operation of all the entry page miss results $EPM_1$ to $EPM_J$ to generate the PAGE MISS status.

FIG. 8 is a diagram illustrating a sequence of state tracking according to one embodiment of the invention. The sequence shows the logical states of the entries on an entry page table having four entries. The sequence includes a first table 810, a second table 820, and a third table 830.

The first table 810 shows the initial state for this sequence. In this initial state, banks 2 and 4 of device 1 are open. These two banks are opened by two previously issued OPEN commands. For bank 2, the dependent banks are the adjacent banks 1 and 3. For bank 4, the adjacent dependent banks are 3 and 5. Both banks are valid (the V bits are set to 1). The other two entries are don't cares and their valid bits are 0.

The second table 820 corresponds to an OPEN command which opens device 3 and bank 3. The access information is loaded into the table. The dependent banks are the adjacent banks 2 and 4. The bank is valid, so its valid bit is set to logic 1.

The third table 830 corresponds to a CLOSE command to device 1, bank 3. Because the first two entries in the table have dependencies on bank 3, this results in banks 2 and 4 being closed. The valid bits are reset and the contents of the corresponding entries are don't cares, available for other entries.

Figure 9A:
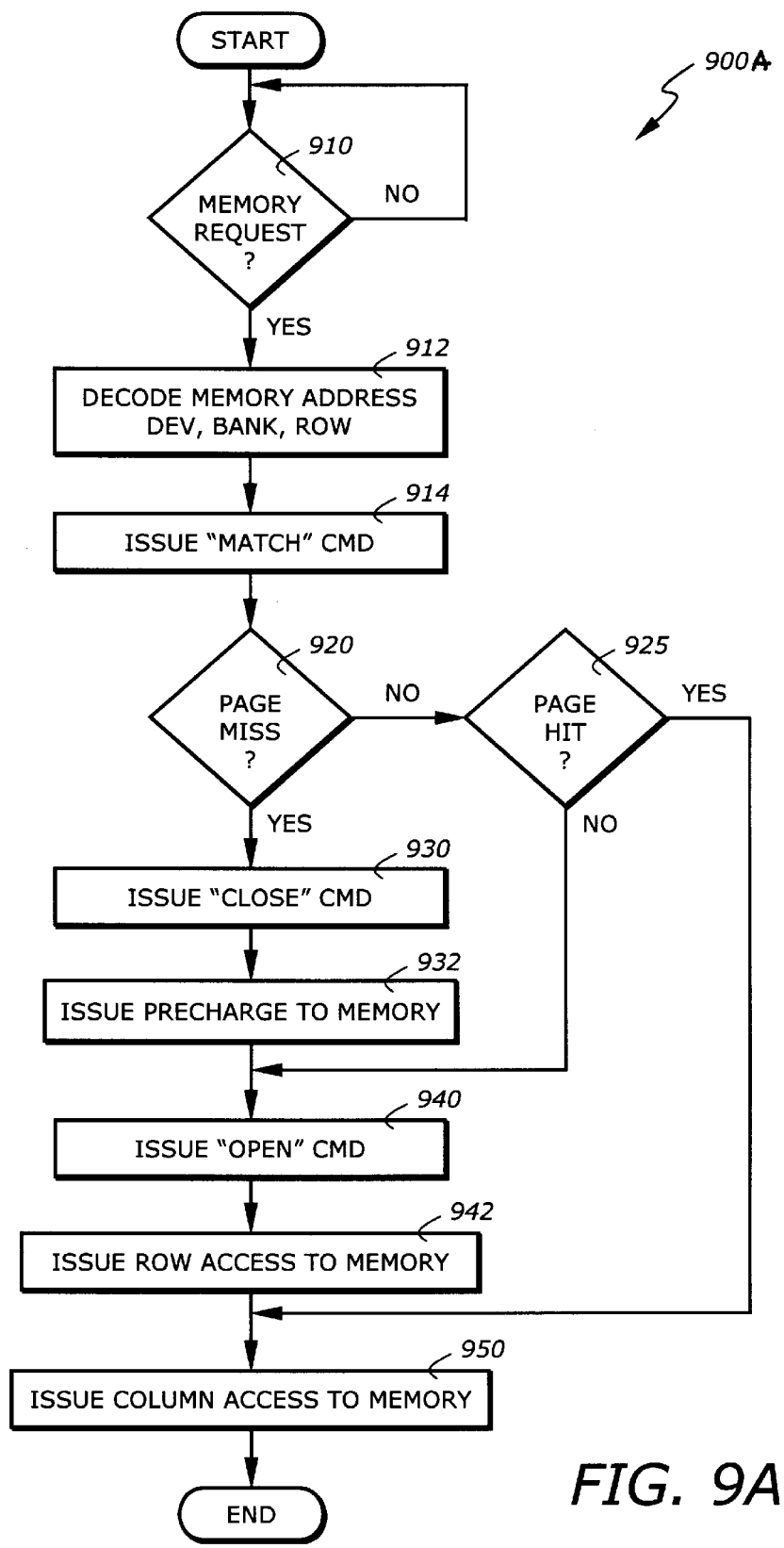
FIG. 9A is a flowchart illustrating a process for access control logic according to one embodiment of the invention.

FIG. 9A is a flowchart illustrating a process for access control logic according to one embodiment of the invention.

Upon START, the process 900A determines if there is a memory request (Block 910). If not, the process 900A returns to block 910. If there is a memory request, the memory address is decoded to provide the device, bank, and row information (Block 912). Then the MATCH command is issued (Block 914). The process 900A then determines if there is a page miss (Block 920). If there is no page miss, the process 900A proceeds to Block 925. If there is a page miss, a CLOSE command is issued (Block 930) followed by a precharge to memory (Block 932). Then an OPEN command is issued (Block 940) followed by a row access to memory (Block 942). Next, the column access to memory is issued (Block 950). The process 900A is then terminated.

In block 925, it is determined if there is a page hit. If there is a page hit, the column access to memory is issued (Block 950) and the process 900A is terminated. If there is no page hit, an OPEN command is issued (Block 940) followed by a row access to memory (Block 942). Next, the column access to memory is issued (Block 950). The process 900A is then terminated.

Figure 9B:
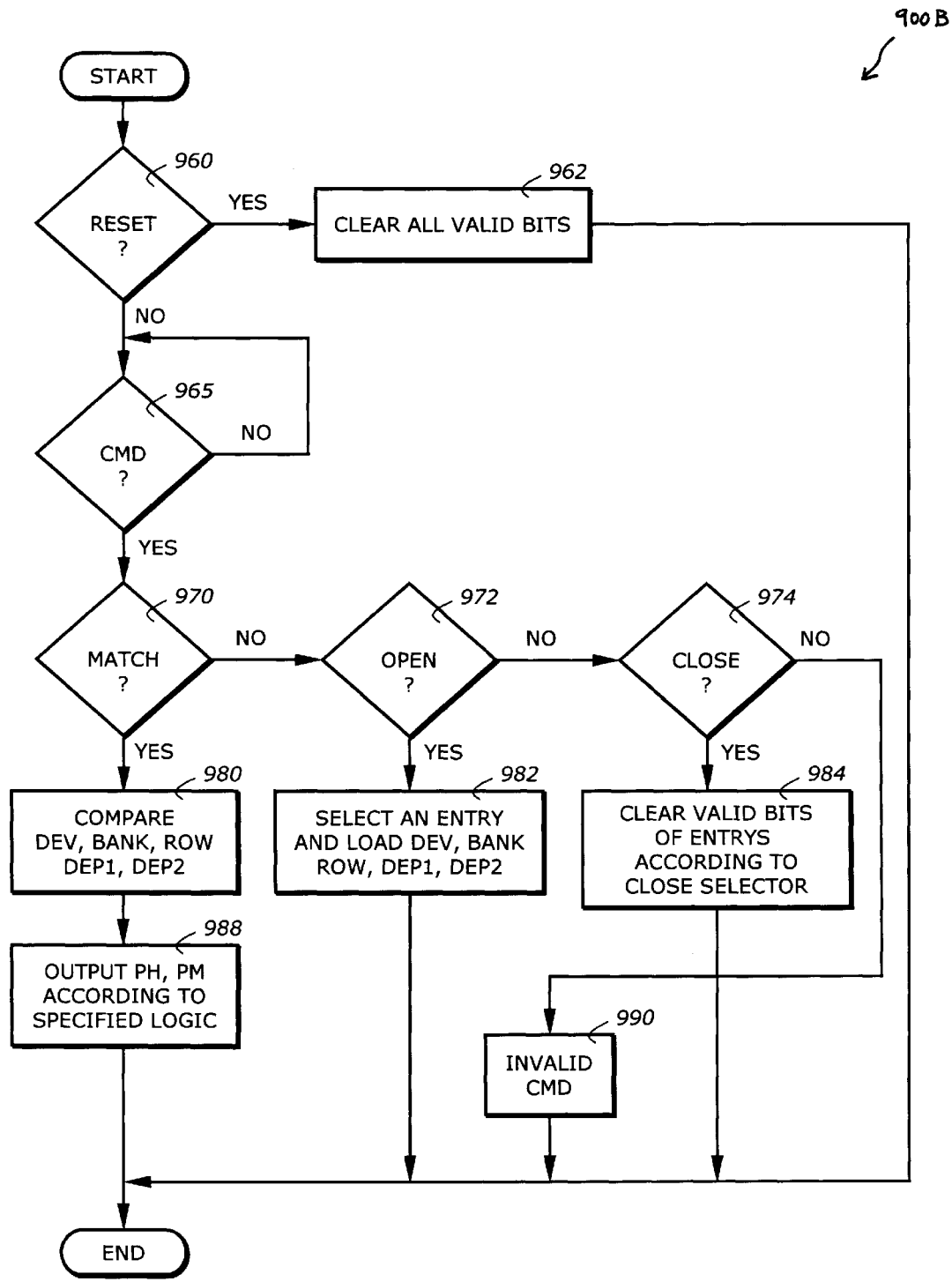
FIG. 9B is a flowchart illustrating a process of tracking the state of a page according to one embodiment of the invention.

FIG. 9B is a flowchart illustrating a process for tracking the state of a page according to one embodiment of the invention.

Upon START, the process 900B determines if there is a reset (block 960). If there is a reset, all valid bits in the entry page table are cleared (block 962) and the process 900 is terminated. If there is no reset, it is determined if there is an issued command (block 965). If no, the process 900B continues to check if there is an issued command. If there is an issued command, the process 900B determines if the issued command is a MATCH command (Block 970). If not, the process 900B goes to block 972. If it is a MATCH command, the process 900B compares the device, bank, row, dependency information with the corresponding entries (Block 980). Then the access status, e.g., page hit (PH) or page miss (PM), is generated according to the specified logic equations (Block 988). The process 900B is then terminated.

In block 972, the process 900B determines if the issued command is an OPEN command. If not, the process 900B goes to block 974. If the issued command is an OPEN command, the process 900B selects an entry and loads the device, bank, row, and dependency information to the entry page table. The process 900B is then terminated.

In block 974, the process 900B determines if the issued command is a CLOSE command. If not, an invalid issued command is declared (Block 990) and the process 900B is terminated. If the issued command is a CLOSE command, the process 900B clears the valid bit of the entry according to the close selector. The process 900B is then terminated.

The present invention is a technique to efficiently track the states of the memory having dependent or hybrid bank structure. The states are tracked by maintaining an entry page table which stores the access information of the pages in the memory. A matching array is used to match the current access information and the bank dependency with the entries in the entry page table. From the match results, the status of the memory access is generated and the contents of the entry page table are updated accordingly. The entries are loaded into or removed from the entry page table according to a command issued from the logic circuit of the memory controller.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   creating a page entry table containing attribute entries including at least a dependency code of a page of a memory device, the page entry table storing a state of the page, the memory device having at least a dependence bank structure, the dependence bank structure having at least a sense amplifier that supports more than one bank of memory cells;
   processing access information in response to a memory access;
   receiving a command from a circuit; and
   updating the attribute entries in the page entry table according to the command and the access information.

2. The method of claim 1 wherein the attribute entries further include at least a device identification, a bank identification, a page address, and a valid code.

3. The method of claim 2 wherein processing access information comprises:
   determining a dependency information based on the device identification; and
   generating the dependency code based on the dependency information.

4. The method of claim 3 wherein the updating comprises:
   matching the access information with the attribute entries; and
   modifying the page entry table according to the command and results of the matching.

5. The method of claim 4 wherein the command includes a match command, an open command, and a close command.

6. The method of claim 5 wherein the match command initiates the matching.

7. The method of claim 6 wherein the modifying includes removing the attribute entries when the command is the close command.

8. The method of claim 6 wherein the modifying includes setting the valid code and loading the access information to the page entry table when the command is the open command.

9. The method of claim 3 wherein the dependency information includes a dependent structure information, an independent structure information, and a hybrid structure information.

10. The method of claim 1 further comprising:
    generating a status information according to a result of the updating and the access information.

11. The method of claim 10 wherein the status information includes a page hit and a page miss.

12. An apparatus comprising:
    a page entry table for containing attribute entries including at least a dependency code of a page of a memory device, the page entry table storing a state of the page, the memory device having at least a dependence bank structure, the dependence bank structure having at least a sense amplifier that supports more than one bank of memory cells;
    an access control circuit to generate access information and a command in response to a memory access; and
    a tracking circuit coupled to the page entry table and the access control circuit to update the attribute entries in the page entry table according to the command and the access information.

13. The apparatus of claim 12 wherein the attribute entries further include at least a device identification, a bank identification, a page address, and a valid code.

14. The apparatus of claim 13 wherein the tracking circuit comprises:
    a dependency generator coupled to the access control circuit to determine a dependency information based on the device identification, the dependency generator generating the dependency code based on the dependency information.

15. The apparatus of claim 14 wherein the tracking circuit further comprises:
    a matching array coupled to the page entry table and the dependency generator to match the access information with the attribute entries;
    an access status generator coupled to the matching array to generate a status information; and
    an entry update circuit coupled to the page entry table and the access status generator to modify the page entry table according to the command and the status information.

16. The apparatus of claim 15 wherein the command includes a match command, an open command, and a close command.

17. The apparatus of claim 16 wherein the match command controls the matching array.

18. The apparatus of claim 17 wherein the entry update circuit removes the attribute entries when the command is the close command.

19. The apparatus of claim 17 wherein the entry update circuit sets the valid code and loads the access information to the page entry table when the command is the open command.

20. The apparatus of claim 14 wherein the dependency information includes a dependent structure information, an independent structure information, and a hybrid structure information.

21. The apparatus of claim 15 wherein the status information includes a page hit and a page miss.

22. A system comprising:

a processor;

a memory device coupled to the processor via a bus, the memory device having at least a bank structure, the dependence bank structure having at least a sense amplifier that supports more than one bank of memory cells;

a memory controller coupled to the processor via the bus and the memory device to track a state of a page of the memory device, the memory controller comprising:

a page entry table for containing attribute entries including at least a dependency code of the page of the memory device, the page entry table storing a state of the page, an access control circuit to generate access information and a command in response to a memory access requested by the processor, and a tracking circuit coupled to the page entry table and the access control circuit to update the attribute entries in the page entry table according to the command and the access information.

23. The system of claim 22 wherein the attribute entries further include at least a device identification, a bank identification, a page address, and a valid code.

24. The system of claim 23 wherein the tracking circuit comprises a dependency generator coupled to the access control circuit to determine a dependency information based on the device identification, the dependency generator generating the dependency code based on the dependency information.

25. The system of claim 24 wherein the tracking circuit further comprises:

a matching array coupled to the page entry table and the dependency generator to match the access information with the attribute entries;

an access status generator coupled to the matching array to generate a status information; and an entry update circuit coupled to the page entry table and the access status generator to modify the page entry table according to the command.

26. The system of claim 25 wherein the command includes a match command, an open command, and a close command.

27. The system of claim 26 wherein the match command controls the matching array.

28. The system of claim 27 wherein the entry update circuit removes the attribute entries when the command is the close command.

29. The system of claim 27 wherein the entry update circuit sets the valid code and loads the access information to the page entry table when the command is the open command.

30. The system of claim 24 wherein the dependency information includes a dependent structure information, an independent structure information, and a hybrid structure information.

* * * * *